Feb. 13, 1940.          S. SHAPIRO          2,190,273
WOMAN'S COMPANION
Filed Aug. 7, 1939          2 Sheets-Sheet 1

INVENTOR,
Samuel Shapiro
BY
his ATTORNEY.

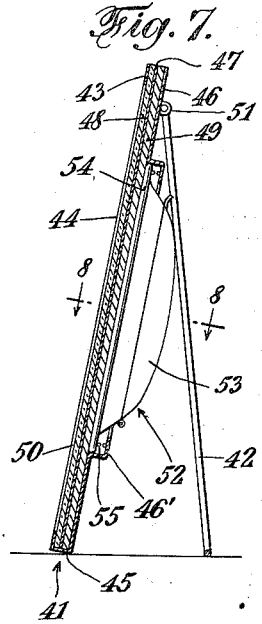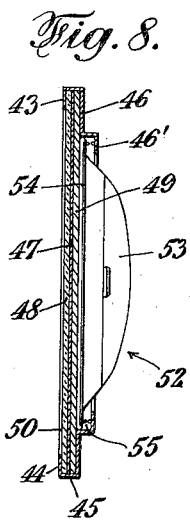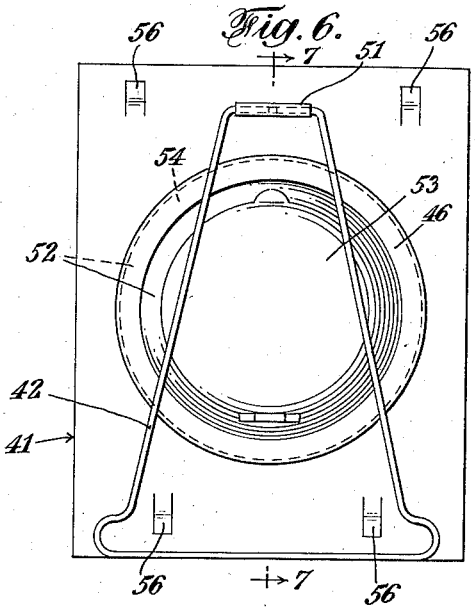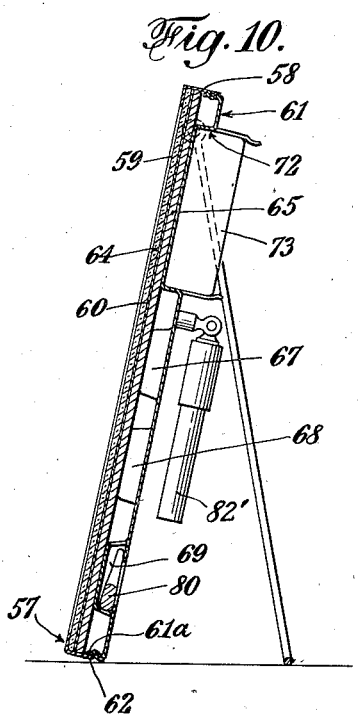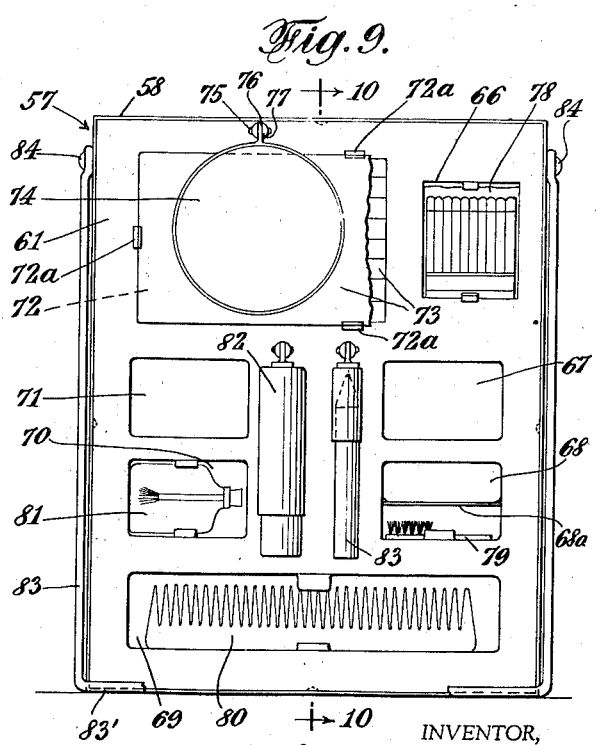

Patented Feb. 13, 1940

2,190,273

UNITED STATES PATENT OFFICE 2,190,273

WOMAN'S COMPANION

Samuel Shapiro, New York, N. Y.

Application August 7, 1939, Serial No. 288,708

3 Claims. (Cl. 40—152)

The subject of this invention is a new article of manufacture, characterized by the combination of a frame or carrier for a particularly liked picture, and a useful addition, such as a cosmetic device; with these two features, the picture or equivalent, and said device, so coacting as to facilitate insertion or removal of the picture, and also so coacting, when assembled, to provide means for securely and protectively holding the picture in place, in the latter connection to allow the picture to be carried to be of a very thin and flimsy material, as Japanese tissue paper or a thin silk, and yet held spread very flat and without waviness or wrinkling while in display position on the new article.

According to the present invention, further, the picture serves normally as a concealing means for the useful addition, that is, in at least the ways of carrying out the invention now preferred, the picture is on one side of the new article, and the useful addition is on the other side of the new article.

By a particularly liked picture is meant one especially meeting the taste or sentimental inclination of the owner of the new article. Such a picture would be, for example, the photograph or other likeness of the sweetheart of the owner of the new article. The word picture is used very broadly, and is so used as inclusive of a legend, such as a favorite piece of prose or verse of poetry, or a design, such as the family coat of arms, and so on.

The invention, in a preferred way of carrying out the same, relates to cosmetic devices, such as compacts, vanity cases and the like. Even where the useful addition above mentioned is such a cosmetic device, the nature of the cosmetic device, and its material, shape, size and nature and intended use, as will be understood, can be varied as desired, all within the spirit and scope of the invention.

Otherwise stated, the invention can be performed in various ways and carried out in different combinations—for example, to provide a new article to be kept in a ladies' handbag; to provide an ornamental and useful article for use on the desk of an office or home worker, as on the desk of a woman business executive; and so on.

While the new article of the invention, as above stated, can include (as one of its group of cooperative elements), a compact, vanity case or the like, and by a like such device is meant, for instance, a toilet aid of any kind, it can also include one or more other useful adjuncts. Such a toilet aid could be, for example, a mirror, a bottle of nail polish, a lip-stick pencil, an eyebrow pencil, a vial or pan of mascara or the like. A useful adjunct of the kind just mentioned could be, for example, one or more components of what may be called a smoker's companion; to mention a few—a holder for matches, either loose or in a match-book or otherwise present, one or more or a package of cigarettes, and so on.

These things are all mentioned here at the beginning of the specification to indicate that the invention can be carried out in various ways, and to state here that but a few of these ways can be herein mentioned, with some of them only, and for purposes of illustration merely, and not for limitation, shown in the accompanying drawings.

In these drawings:

Fig. 6 is a view similar to Fig. 1, but showing another one of the many possible embodiments of the invention, and an embodiment of the kind intended to be stood say on the desk of a woman office worker or on a table or the like in her boudoir.

Fig. 7 is a central vertical section, taken substantially on the line 7—7 of Fig. 6.

Fig. 8 is a horizontal section, taken substantially on the line 8—8 of Fig. 7.

Fig. 9 is a view similar to Fig 6, but showing another type of structure adapted for use on the desk.

Fig. 10 is a central vertical section, taken substantially on the line 10—10 of Fig. 9.

Figure 1:
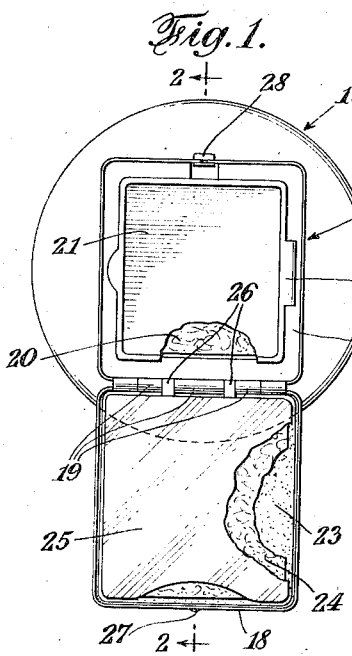
Fig. 1 shows, in what may be called rear elevation, one of the many possible apparently widely different embodiments of the invention, and an embodiment of the kind intended to be kept in a ladies' handbag or other similar place.
Figure 2:
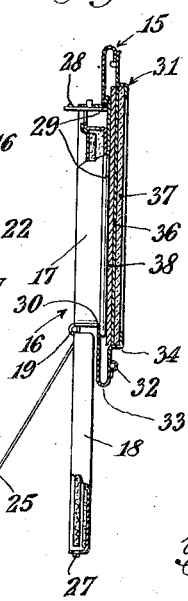
Fig. 2 is a central section, taken substantially on the line 2—2 of Fig. 1.
Figure 3:
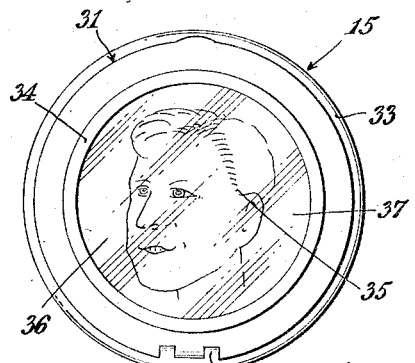
Fig. 3 is a front elevation thereof.

Now to refer in detail to these drawings, but first expressly pointing out that the scope of patent protection contemplated is to be taken solely from the attached claims, interpreted as broadly as is consistent with the prior art, and again emphasizing that no other limitations, as to materials, shapes, sizes, numbers and relations of parts, etc., are to be taken from the following detailed description of the structures illustrated in the drawings:

Referring in detail to the form of the invention shown in Figs. 1, 2 and 3, the same includes a main frame 15, which happens here to be shown as circular in outline. Set in this frame is a vanity case 16, which here happens to be shown as substantially square in outline.

Since some type of vanity case must be illustrated, the case 16 is shown, in accordance with familiar practice in making this case, as being in two parts, a main hollow part 17 and a hollow cover 18. These parts are usually hinged together as at 19. Within the casing 16 is a rouge cake 20 in a rouge compartment in the part 17, and a lid 21 for said compartment hinged at 22. A compartment is provided in the part 18 for face powder 23 and a pad-type powder-puff 24. This compartment is closable by a lid 25, hinge-mounted at 26, and which lid, as by chromium plating and high polishing, has a surface for acting as a mirror. At 27 and 28 are indicated the pin and keeper elements of a common type of latch-lock, for acting to hold the case 16 closed when the half 18 is swung to lie over the half 17 and snapped tight against the latter.

The case 16 at its rear or bottom, in the present case at the bottom of the half 17, is provided with a peripheral bead 29. The wall of the frame facing the observer in Fig. 2, has an opening 30 of substantially the same shape and size as the case 16, and so not large enough to allow the bead 29 to be passed through said opening. Accordingly, with the back of the frame 15 open, the case 16 can be mounted on the frame merely by inserting the case through the opening 30, in a direction toward the back of the frame. Forming a part of the frame 15, but constituting a removable or movable part thereof, is a rear structure, adapted to be removably secured in place on the frame, and for then providing a means to coact with the bottom of the case 16 and with the bead 29 and with the opening 30, to hold the case 16 immovably mounted on the frame 15. In the present case, the frame part just referred to is shown as in the form of a generally circular plate 31, hinged at 32 to the main part of the frame, that is, the part of the frame carrying the opening 30, and which main frame part is marked 33. The main frame part 33, shown best in Fig. 2, is circumferentially thereof a shell of substantially U-shaped cross-section, with the width of the bowl of the U somewhat exceeding the thickness of the bead 29. This is not necessary, however, as the holder next to be referred to could be of any desired depth. This holder, marked 34, is a framing means proper for the picture, as the male countenance shown at 35 in Fig. 3. The display opening provided by this frame means 34 is here shown as circular in outline, but of course it could be otherwise shaped. The picture 35 is carried by a sheet 36, which sheet could be as already indicated of any desired material or degree of thinness or limpness. In order at once to protect the picture and to hold it flat, so that on closing of the plate 31 agains the main part 33 of the frame 15, not only will the case 16 be secured in place, but also the sheet will be drawn taut and the picture held undistorted by waviness or wrinkling; the sheet 36 is shown as sandwiched between a transparent sheet 37 and a backing sheet 38. The sheet 37 could be of glass, Celluloid, Cellophane, Pliofilm or other suitable material; while the sheet 38 could be of felt, cardboard, metal or any other suitable material.

Figure 4:
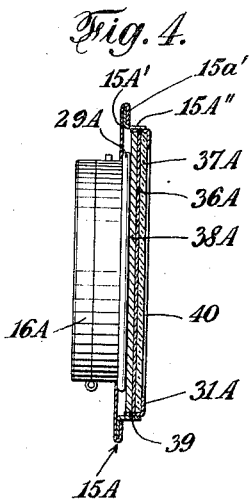
Fig. 4 is a view similar to Fig. 2, but somewhat modified as to a detail of construction.

Referring now in detail to the modification shown in Fig. 4, the vanity case or the like is indicated at 16A, and its carrying frame at 15A. The picture carrying sheet, the transparent cover sheet therefor, and the backing sheet for the picture sheet, are indicated respectively at 36A, 37A and 38A. Here, too, the vanity case carries a peripheral basal bead, the same marked 29A. In the present case, however, the frame 15A is shown as comprising three stamped or spun metal parts. Two of these, marked respectively 15A' and 15A'', provide the main part of the frame. The part 15A'' includes a peripheral flange substantially parallel with the base of the vanity case for being clamped in an annular pocket provided as shown peripherally of the part 15A' by turning over a reversely bent annular flange 15a'. The remainder of the part 15A'' is here shown as providing a cylindrical cup, having at spaced points therearound inwardly facing teats 39, for snapping into matchingly shaped and located recesses in the side wall of the cup-shaped auxiliary frame part 31A. This part last-mentioned has a suitable opening 40 therethrough for displaying the picture carried by the sheet 38A when the parts are arranged as shown in Fig. 4.

Figure 5:
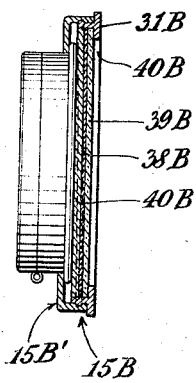
Fig. 5 is a similar view, showing another such modification.

Referring to the modification of Fig. 5, the parts here shown, as will be noted, correspond to those shown in Figs. 1 through 4, except that here the frame 15B is made up of a main part 15B' including a cylindrical side wall provided interiorly with a female thread, and an auxiliary part, corresponding to the closing plate 31 of Figs. 1, 2 and 3, comprising a ring 31B having a picture-exposing opening 40B and including a cylindrical extension for entry into the cylindrical portion of the main frame part; said cylindrical extension having on its exterior a male thread matching the thread first-mentioned. At 38B, 39B and 40B are indicated, respectively, the sheet for carrying the picture, the transparent cover sheet and the preferably more or less cushioning backing sheet.

Referring next to the form of the invention shown in Figs. 6, 7 and 8, this differs from those previously described, in that it is a type of embodiment adapted to rest on a table-like support. The same comprises an easel-like arrangement, that is, a picture frame 41, and an easel-back 42, the latter hereinafter referred to as the brace.

In the present case, the frame 41 is shown as of the conventional type, including a metal front 43 surrounding a quadrilateral opening 44, and continued integrally as an edge-wall 45, and beyond the latter as a back-wall 46. The edge-wall 45, as common to one species of frame of this type, extends only along the sides and bottom edges of the frame, as shown in Figs. 7 and 8, leaving the top edge thereof open, as shown in Fig. 7, to provide a mouth through which may be endwisely inserted a sheet carrying a picture, a transparent cover sheet, and a cardboard or other similar backing-sheet. These three sheets are here shown, respectively, at 47, 48 and 49. Then, the picture carried by the sheet 48 is displayed through the opening above mentioned, this opening marked 50. In the usual frame of this kind, the back 46 or equivalent is commonly continuous and rigid all over the rear face of the frame; except sometimes, as illustrated at 51, a portion of the back is struck out and rolled over to provide a sleeve for pivotally mounting the brace, especially when the latter is formed of a single length of wire as here shown. In a device according to the present invention now being described, however, the principles of the invention are applied, by providing the back 46 with special formations to act as the means for removably mounting the useful addition and also for holding the sheet 47 carrying the picture, no matter how flimsy be the material of which said sheet is made. As in the views already described, said useful addition is here, for example, shown as a toilet aid, but as one of circular outline, and so built as to constitute what is commonly termed a compact. This compact is marked 52. As will be noted, this compact, although otherwise of conventional construction, including a hinged lid 53, is provided with a basal bead 54 here shown as running all around the compact. Surrounding said bead, a cup-mount portion 46' of the material of the back 46 is given an L-shape cross-sectionally, to provide a receptor for the bead 54, and also for a helical wire spring 55, as shown. This spring serves a very useful purpose, and is preferred if not necessary either as such or an equivalent. With such a spring-mounting for the compact 53, the entire flat bottom of the latter acts as a flattening presser-plate relative to the sheet 47 carrying the picture. Its presence does not interfere with easy insertion of the sheets 47, 48 and 49 as a single plural-ply unit, since, when such unit has been sent down into the frame far enough to have its bottom almost reach the top of the compact, a finger of the manipulator may be sent through the opening 50 to press in the upper portion of the compact and hold such portion pressed in, until incidental to further downward thrust of said unit the lower edge of the latter passes down beyond the upper edge of the bead 54. The finger may now be removed, as from this point on a single quick thrust of said unit will arrange the parts as shown in Fig. 7.

The arrangement just described acts flatteningly of a large central area of the picture, where the frame and the compact are relatively dimensionally substantially as illustrated; even so, with some favored types of very flimsy picture-carrying sheets, especially where the transparent sheet 48 is Pliofilm only a few thousandths of an inch in thickness, it is desirable to apply flattening pressure to the picture-carrying sheet substantially all over the same. In the structures shown in Figs. 6, 7 and 8, this is done by means of four metal tongues 56 struck out from the material forming the back 46.

Referring to the form of the invention shown in Figs. 9 and 10, here again is shown a type of embodiment adapted to rest on a table-like support. In this case, the frame marked 57 is shown as comprising a generally cup-shaped member 58 of quadrilateral outline; with its bottom largely cut away to provide a quadrilateral opening 59 for the display of the picture carried by a sheet 60. The complementary part of this frame is a rear wall member 61, preferably stamped or drawn from sheet metal, and including a surrounding wall 61a for snug reception within the side walls of the cup 58. At suitable intervals around these side walls, and at matching points along the wall 61a of the member 61, are integral teat and depression elements, each of one type for coacting with one of another type, and one of the couples whereof is indicated at 62. As will be understood from the construction as so far described, the sheet 60 and its associated transparent cover sheet 64 and cushioning backing sheet 65, are merely laid in the cup 58, preparatory to insertion therein and coupling thereto of the member 61 as just above described. In order that the frame shall act flatteningly of the picture-carrying sheet 60 according to the invention, the sheet metal of which the rear member 61 is formed, like the sheet metal of which the back 46 of Figs. 6, 7 and 8 is formed (in order to have the tongues 56 act resiliently) is made of a resiliently flexible rather than a deadly flexible material; and the rear member 61 is provided with a plurality of properly spaced depressions for serving respectively a variety of useful purposes. Preferably, as shown, these depressions have flat bottoms, each such bottom to act as a presser-plate relative to the picture-carrying sheet. A proper arrangement of these pockets is one which would advantageously space the pocket bottoms over the picture area. In the present case such pockets are shown as spaced substantially marginally of the frame; as indicated at 66, 67, 68, 69, 70, 71 and 72. These pockets can be used for different purposes; for instance, as storage receptacles for toilet aids, components of a smoker's companion, and so on. Any one of them can be used as a storage receptacle only, or as such, in rear of a special mount for some useful device. As to this last-mentioned case, an illustration thereof is indicated at the upper left in Fig. 9, where the pocket 72, as for storing a package of cigarettes 73, and provided with spring-clips 72a for holding the package of cigarettes in place, is normally partially covered by a mirror 74 pivoted at 75, by way of a top-leaf 76, to the bifurcated outer end of a post 77 suitably secured to the rear member 61, and of a height to have the back of the mirror clear the cigarette package 73. In the pocket 66 is shown a book-match packet 78, with the cover flap torn away. The pocket 68 is shown as a double-compartment one, to contain on a shelf 68a a box 68 of mascara, and to house therebelow a mascara brush 79. The pocket 69 is shown as accommodating a comb 80. The pocket 70 is shown as removably storing a bottle of nail polish 81. The pockets 67 and 71 are shown as empty, for the accommodation of any articles desired. In the space between the pockets 71 and 70, and 67 and 68, are shown as pivotally mounted on posts like the post 77, a lip-stick package 82 and an eye-brow pencil 82'.

The frame of Figs. 9 and 10 is of easel-type, incorporating a brace 83, here shown of bent wire type as in Figs. 6 and 7, but pivotally mounted at its top, and at its opposite ends, to the sides of the frame 57, as at 84. This permits the device of Figs. 9 and 10 to be normally arranged as shown in these views, and at the same time allows of a swing of the brace 83 through almost 360 degrees, to throw its bottom bar 83' to the front of the frame, and so that then the easel device will be transformed into one such that the back of the frame faces the person desiring to use the same, just as the front of the frame would normally face a person seated toward the left in Fig. 10 and facing the picture.

Figure 11:
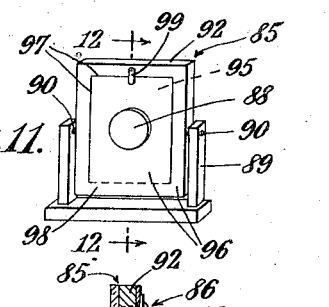
Fig. 11 is a perspective view, on a very much reduced scale, of still another type of office desk or boudoir-table embodiment.
Figure 12:
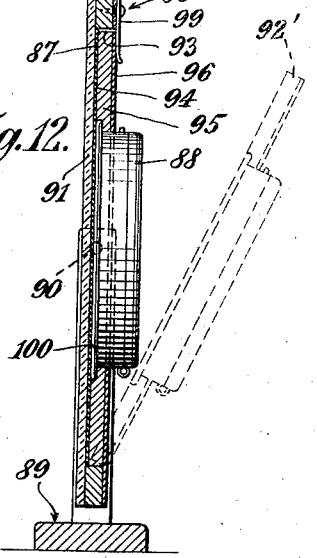
Fig. 12 is a central vertical section, taken substantially on the line 12—12 of Fig. 10.

Referring finally to Figs. 11 and 12, here a structure is shown which is also a desk-type embodiment of the invention. The same comprises a frame 85, generally of the type shown in Figs. 1, 2 and 3, except that it is quadrilateral in outline and more or less conventional in construction, so far as are concerned its main portion 86 and its back 87. This frame, however, mounts, according to the principles of the invention, a useful addition, the latter in the present case shown as a compact 88.

The frame 85 is swingably mounted about a horizontal axis by means of a U-shaped stand 89 and pivots 90. The frame is here shown as of the more or less familiar type made up of a sheet of glass 91, having mounted on its rear face, and attached thereto by a suitable adhesive, a wood or cardboard quadrilateral frame 92. The opening 93 in this frame is of a size to take a sheet 94 carrying a picture to be displayed through the glass 91. A backing for the picture is, in this type of frame, a wood or cardboard plate 95. Adhesively attached to the back of this plate 95 and also to the rear side of the member 92 is a sheet of felt 96, the latter having a U-shaped slit 97; so that the member 92 can be swung to the position 92' shown in broken lines in Fig. 12, with a line across the felt indicated in broken lines at 98 in Fig. 11 acting as a hinge. When the parts are arranged as shown in full lines in Figs. 11 and 12, they are retained in that condition by a metal clip constituting a turn-button 99. According to this type of frame as previously constructed, the member 92 is swung out as just described, for the insertion of a picture, or the substitution of one picture for another. In the present case, it is thus swung out also for mounting therein according to the invention of a useful addition, the compact 88 as aforesaid. This compact has a basal bead 100; and the member 92 has an opening shaped to accommodate said bead and allow projection therethrough of a part of the body of the compact. Normally, the device would be set on the owner's desk or dressing-table with the side carrying the glass 91 facing the front. Whenever the useful addition is desired to be used, the frame 85 is rotated through 360 degrees, then to have the lid of the compact 88 face the observer.

While I have shown and described what I now believe to be very satisfactory and practical structures according to the invention, it will be understood that various changes and modifications can be resorted to within the scope of the appended claims, and parts of the improvements can be used without others.

I claim:

1. An article of manufacture, comprising a frame having a display opening; a utility unit having at one end a lateral enlargement, said enlargement of smaller size than said display opening; a subsidiary frame part for backing said opening; means partially including said enlargement and partially carried by said subsidiary frame part for mounting said unit on the frame; and a substantially flat and flexible object of greater size than said display opening and disposed between the utility unit and the subsidiary frame part.

2. An article of manufacture, comprising a frame having an opening for the display of a picture; a back having an opening; a detachable utility unit having a main body shaped to be passed through the opening last-named and having substantially at the front end of said body a lateral enlargement too large to pass through said opening last-named; and a picture disposed between said frame and said back and in front of said enlargement.

3. An article of manufacture, comprising a frame incorporating a plurality of relatively movable elements one of which is a front structure having a display opening and the other of which is a rear structure for normally providing a back for said opening; and a means for pressing flat a picture on a relatively thin flexible sheet when said sheet is interposed between said frame structures, said means comprising a plurality of elements spaced over said rear structure, said elements being located so as individually locally to stiffen said rear structure, said elements being shaped like boxes with their tops facing the rear of the device and having their bottoms substantially in a common plane parallel with but forwardly offset from the general plane of said rear structure to cause said bottoms to act flatteningly against the picture carrying sheet.

SAMUEL SHAPIRO.